L. WESSEL.
BALL AND SOCKET JOINT.
APPLICATION FILED NOV. 25, 1907.

978,091.

Patented Dec. 6, 1910.

Witnesses
Inventor
Louis Wessel
By
Attorneys

UNITED STATES PATENT OFFICE.

LOUIS WESSEL, OF CINCINNATI, OHIO, ASSIGNOR TO THE CINCINNATI BALL CRANK COMPANY, OF CINCINNATI, OHIO, A CORPORATION.

BALL-AND-SOCKET JOINT.

978,091.  Specification of Letters Patent. Patented Dec. 6, 1910.

Application filed November 25, 1907. Serial No. 403,700.

*To all whom it may concern:*

Be it known that I, LOUIS WESSEL, a citizen of the United States, residing at Cincinnati, in the county of Hamilton and State of Ohio, have invented certain new and useful Improvements in Ball-and-Socket Joints, of which the following is a specification.

My invention relates to an improvement in a ball and socket joint primarily employed in steering mechanism for vehicles.

The object of my invention is to provide a ball and socket joint, wherein one or more of the sockets are yieldingly held in position against the ball, and means for adjusting the tension against the sockets.

Various other features of my invention relate to the peculiar construction which will be more fully set forth in the description of the accompanying drawings forming a part of this specification, in which:—

Figure 1:
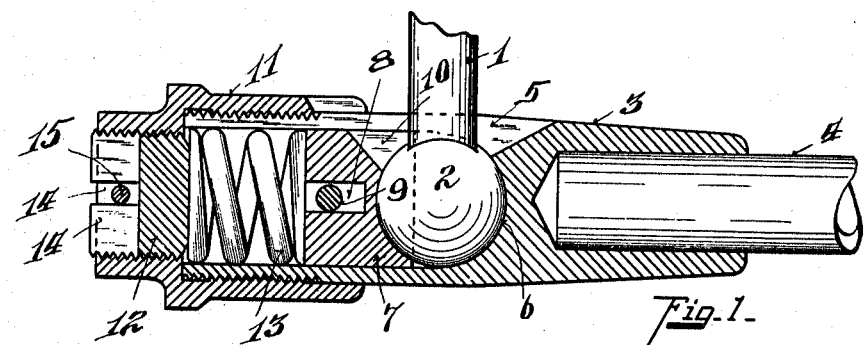
Figure 2:
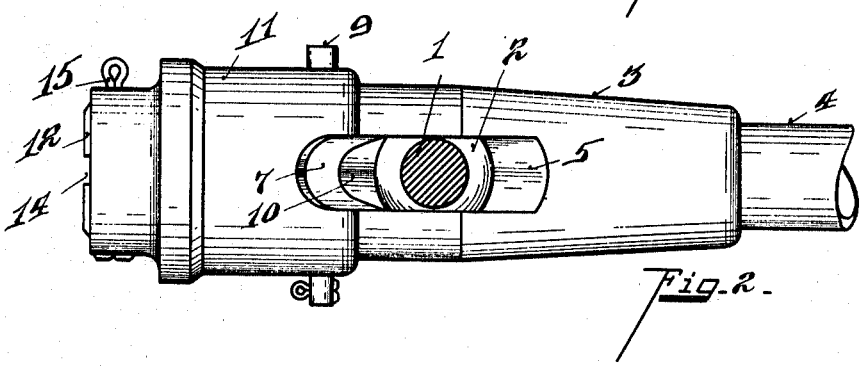
Figure 3:
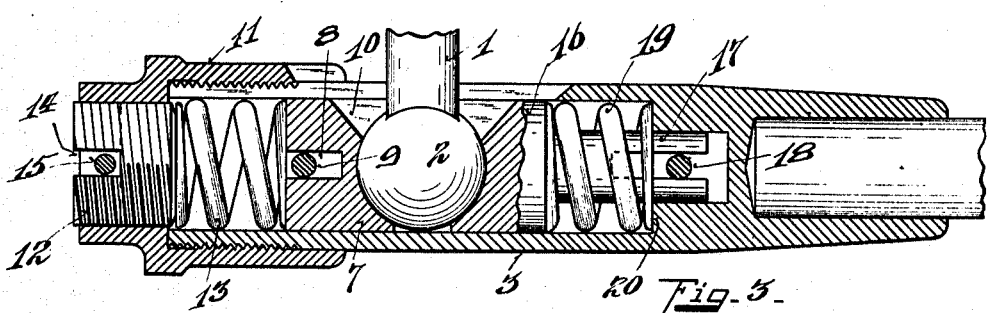
Figure 4:
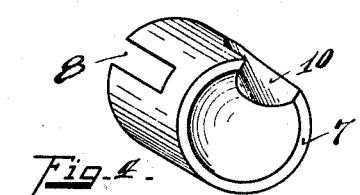

Figure 1 is a central vertical section illustrating my improved ball and socket joint. Fig. 2 is a top plan view of the same. Fig. 3 is a central section illustrating two sockets yieldingly mounted. Fig. 4 is a perspective view of one of the socket members.

In the drawings I have shown only so much of the steering mechanism for vehicles as disclose my invention, the joint being preferably employed in connecting the depending arm actuated by the steering wheel and gearing with the connecting rod carried forward to lever mechanism connecting with the front wheels of a vehicle.

1 represents the arm depending from suitable steering gearing provided at its free end with the ball 2.

3 represents a sleeve into which the arm 1 and ball 2 project and into which sleeve the connecting rod 4 is secured, the arm 1 projecting through a slot 5 formed in the sleeve 3.

6, (Fig. 1) represents a stationary socket formed in the sleeve 3 against which a portion of the periphery of the ball 2 bears.

7 represents a movable socket member bearing against a portion of the periphery of the ball 2 and mounted within the sleeve 3.

8 represents a notch formed in the socket member 7 through which a taper pin 9 passes, having bearing within the sleeve 3 for preventing the socket member 7 from turning within the sleeve.

10 represents a notch formed in the socket member 7 in alinement with the slot 5 of the sleeve 3 permitting the arm 1 to have a given radius of movement.

11 represents a cap screw threaded upon the sleeve 3.

12 represents an adjusting plug screw threaded within the cap 11 forming means for adjusting the tension of spring 13 against the socket member 7. The adjusting plug 12 is provided with the cross grooves 14 through which a lock pin is inserted for maintaining the plug in its adjusted position. Thus to adjust the tension and sockets relative to the ball, the lock pin 15 is removed and the screw plug adjusted as desired. The pin 9 forms a lock for preventing the cap 11 from coming detached.

In the form shown in Fig. 3 the sleeve 3 is made of larger length permitting the insertion of a second yielding socket member 16 provided with a stem 17 slotted at its free end through which a pin 18 passes to prevent the socket member turning. 19 represents a spring encircling said stem 17 bearing against the socket member 16 and the shoulder 20 formed within the sleeve, the forward end of the socket connection being constructed identically as that shown in Fig. 1.

Having described my invention, I claim:—

In a ball and socket joint, a sleeve, two socket members in the sleeve, one of which is longitudinally movable, the sleeve and movable socket member each provided with a slot, an arm having a ball end engaging between said socket members with the arm projecting through said slots to limit the movement thereof, a pin projecting through said sleeve and a notch in the movable socket member to hold the same against rotation, a spring for exerting tension against said movable socket member, and a combined cap and adjusting plug adjustable on the end of the sleeve to adjust the tension of said spring, substantially as described.

In testimony whereof, I have hereunto set my hand.

LOUIS WESSEL.

Witnesses:
OLIVER B. KAISER,
LEO O'DONNELL.